(12) United States Patent
Ramey et al.

(10) Patent No.: US 6,605,327 B1
(45) Date of Patent: Aug. 12, 2003

(54) VINYL ACETATE COPOLYMERS IN HOSES

(75) Inventors: Marty A. Ramey, Buchanan, TN (US); Ron H. Moody, Paris, TN (US)

(73) Assignee: Dana Corporation, Toleod, OH (US)

( * ) Notice: Subject to any disclaimer, the term of this patent is extended or adjusted under 35 U.S.C. 154(b) by 32 days.

(21) Appl. No.: 09/688,132

(22) Filed: Oct. 16, 2000

(51) Int. Cl.⁷ .......................... B32B 17/10; B32B 25/02; B32B 25/04
(52) U.S. Cl. ...................... 428/36.2; 138/126; 138/140; 138/153; 138/DIG. 7; 428/36.8; 428/441; 428/442; 428/463; 428/476.1
(58) Field of Search ................. 428/35.7, 36.2, 428/36.91, 441, 476.1, 36.8, 442, 463; 138/126, 140, 153, DIG. 7

(56) References Cited

U.S. PATENT DOCUMENTS

| | | | |
|---|---|---|---|
| 4,057,610 A | * 11/1977 | Goettler et al. | 264/108 |
| 4,259,991 A | * 4/1981 | Kutnyak | 138/127 |
| 4,385,018 A | 5/1983 | Kutnyak | 264/45.9 |
| 5,373,870 A | 12/1994 | Derroire et al. | 138/125 |
| 5,380,385 A | 1/1995 | Derroire et al. | 156/149 |
| 5,588,468 A | 12/1996 | Pfleger | 138/121 |
| 5,639,528 A | 6/1997 | Feit et al. | 428/36.91 |
| 5,910,544 A | 6/1999 | Ozawa et al. | 525/178 |
| 6,348,543 B1 | * 2/2002 | Parker | 525/106 |

* cited by examiner

Primary Examiner—Sandra M. Nolan
(74) Attorney, Agent, or Firm—Rader, Fishman & Grauer PLLC

(57) ABSTRACT

A multilayer automotive hose includes an innermost layer of elastomer material, and a separate outermost layer of elastomer material, each including between about 40% and about 80% vinylacetate by weight in a copolymer. The elastomer layers are formed by an extrusion process. The vinylacetate is copolymerized with polyethylene. Each of the elastomer layers has a fully saturated backbone. As a result, each of the innermost and outermost layers is a non-thermoplastic elastomer.

16 Claims, 1 Drawing Sheet

VINYL ACETATE COPOLYMERS IN HOSES

FIELD OF THE INVENTION

The present invention relates to the field of automotive hoses. More particularly, the present invention relates to the field of hoses used in the automotive industry that typically include elastomer materials.

BACKGROUND OF THE INVENTION

There is a growing demand for lighter automotive hoses that are used for transporting such compounds as fuels, refrigerant, and other volatile gases and fluids. The hoses must have a low permeability to provide a barrier for gases both outside and inside the hose. The hoses must also be flexible enough to absorb the vibration of the automotive components to which they are connected. Further, the hoses must be able to withstand the high temperatures that exist in the automobile engine environment, as well as the corrosive compounds that tend to accumulate in that environment.

In view of these considerations many automotive hoses employ a polyacrylate material, taking advantage of its combined softness and strength, or chlorinated polyethylene (CPE) material. However, there is a need for automotive hoses made from materials having greater dimensional stability or "green strength." There is also a need for automotive hoses that have improved processability. Specifically, it is desirable to eliminate the post-cure step normally associated with hose manufacturing. The hose should have better aging properties than hoses that incorporate CPE material, and at least maintain the aging properties of hoses incorporating polyacrylate material.

SUMMARY OF THE INVENTION

The above-described needs and others are met by the present invention, which may be embodied and described as a multilayer automotive hose, which includes an innermost layer of elastomer material, and a separate outermost layer of elastomer material. Each of the innermost layer and outermost layer includes between about 40% and about 80% vinylacetate by weight in a copolymer. The concentration of vinylacetate is most preferably between about 60% and about 70% by weight. The elastomer layers are formed by an extrusion process. The vinylacetate in the innermost and outermost layers is copolymerized with polyethylene. Each of the elastomer layers has a fully saturated backbone. As a result, each of the innermost and outermost layers is a non-thermoplastic elastomer.

The automotive hose further includes a middle layer made up of reinforcement fibers, disposed between the innermost and outermost layers. The middle layer is preferably disposed directly between the innermost layer and the outermost layer.

Each of the innermost layer and outermost layers is preferably a nonhalogenated elastomer. LEVAPREN™ EVM elastomer materials made by Bayer Corp. are used in a most preferred embodiment of the invention, and are made from ethylene-vinyl actetate copolymer rubber.

Additional advantages and novel features of the invention will be set forth in the description which follows or may be learned by those skilled in the art through reading these materials or practicing the invention. The objects and advantages of the invention may be achieved through the means recited in the attached claims.

BRIEF DESCRIPTION OF THE DRAWINGS

The accompanying drawings illustrate the present invention and are a part of the specification. Together with the following description, the drawings demonstrate and explain the principles of the present invention.

DETAILED DESCRIPTION OF THE PREFERRED EMBODIMENTS

Using the drawings, the preferred embodiments of the present invention will now be explained.

Figure 1:
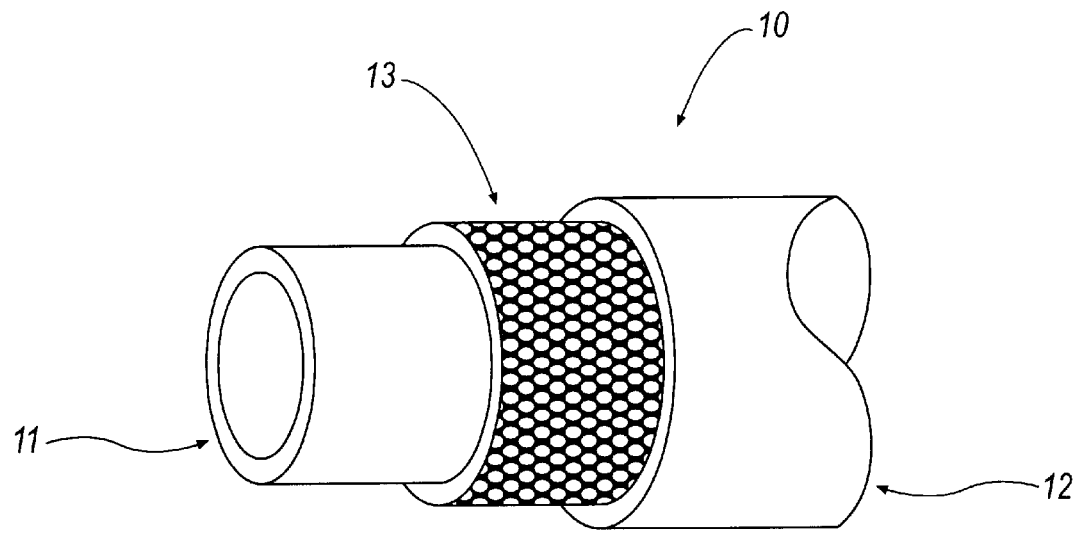
FIG. 1 shows a multilayer automotive hose according to the present invention.

FIG. 1 shows an exemplary hose 10 according to the principles of the invention. The hose 10 includes an innermost layer 11 of elastomer material, and a separate outermost layer 12 that is also made of elastomer material. Each of the innermost layer 11 and outermost layer 12 includes between about 40% and about 80% vinylacetate by weight in a copolymer. In a most preferred embodiment of the invention, the vinylacetate concentration is between about 60% and about 70% by weight, as the hose produced using vinylacetate in this range surprisingly exhibits remarkably enhanced oil resistance. The vinylacetate in the innermost and outermost layers 11, 12 is copolymerized with polyethylene as poly(ethylene co-vinylacetate). Each of the elastomer layers has a fully saturated backbone. As a result, each of the innermost and outermost layers 11, 12 is a non-thermoplastic elastomer.

The poly(ethylene co-vinyl acetate) elastomer of the innermost and outermost layers 11, 12 includes the advantage of a fully saturated backbone. The fully saturated backbone of the copolymer provides outstanding properties including excellent resistance against heat, weathering, ozone and oil. Consequently, the hose 10 of the present invention can be used for transportation of a variety of fluids and gases. For example, the durability and resistance properties of the hose 10 allow it to be used, among other things, as an engine oil cooler hose, a power steering return hose, or a transmission oil cooler hose.

Figure 2:
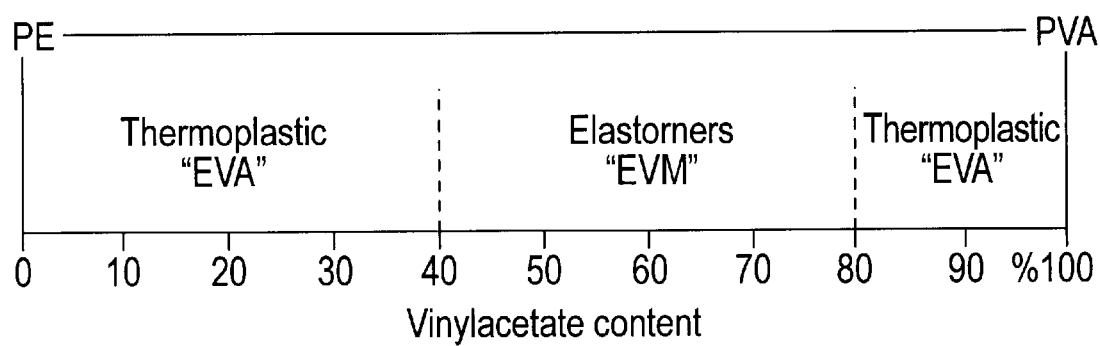
FIG. 2 shows a schematic classification of ethylene vinylacetate copolymers according to their vinylacetate content.

Ethylene vinylacetate copolymers can be synthesized with the comonomers being present at every ratio. FIG. 2 shows a schematic classification of ethylene vinylacetate copolymers according to their vinylacetate content. Polymers manufactured with various vinylacetate content exhibit a complete scale of properties from thermoplastic material to elastomer material. Polyethylene is a well known thermoplastic with a very low glass transition temperature at about −120° C. and very high crystallinity of 40 to 60%. Polyvinylacetate is also a thermoplastic, but with a glass transition temperature of 28° C. and a completely amorphous structure. Surprisingly, copolymerization of polyethylene and polyvinylacetate does not always result in a thermoplastic.

As shown in FIG. 2, when vinylacetate is copolymerized with a polyethylene chain, the resultant copolymers are usually thermoplastic. However, elastomers result when at least about 40% by weight of the copolymer is vinylacetate. The "rubber region" or "EVM" region of the schematic extends between about 40% by weight vinylacetate, and about 80% by weight vinylacetate. Above 80% by weight vinylacetate, the thermoplastic properties of the polyvinylacetate becomes predominant. Below 40% by weight vinylacetate, the thermoplastic properties of the polyethylene becomes predominant. As shown in FIG. 2, the rubbery copolymers in the region of between about 40% and about 80% by weight vinylacetate are designated as EVM according to rubber nomenclature, with the "M" standing for the saturated backbones of the copolymer molecules. The thermoplastic ranges are designated as EVA although this abbreviation is also frequently used for the entire class of ethylene vinylacetate copolymers.

Another important advantage of the EVM grade ethylene vinylacetate copolymers that are used according to the principles of the present invention is the ability of such copolymers to be extruded. Extrusion technology has shown to provide an efficient, cost effective manner of manufacturing hoses.

Exemplary elastomer materials that provide the advantages and characteristics for an automotive hose described above include Levapren™ EVM ethylene vinylacetate copolymers produced by Bayer Corp. The Levapren™ EVM ethylene vinylacetate copolymers are non-halogenated technical elastomers, and therefore do not emit toxic halogen acids, while exhibiting outstanding resistance to weathering and ozone, excellent heat resistance, and very good oil resistance. These elastomers further exhibit excellent compression set properties at high temperatures, making the extruded hoses manufactured therefrom able to withstand the extreme environment of an automotive engine.

As shown in FIG. 1, the automotive hose 10 preferably includes a middle layer 12. The middle layer is made up of reinforcement fibers. The middle layer 12 is disposed between the innermost and outermost layers. According to the most preferred embodiment of the invention, the middle layer 12 is preferably is directly in contact with the innermost layer 11 and the outermost layer 12 of the hose 10.

While the preceding description of the automotive hose 10 is an exemplary embodiment of the present invention, it is not intended to be exhaustive or to limit the invention to any precise form. Many modifications and variations are possible in light of the above teaching. The preferred embodiment was chosen and described in order to best explain the principles of the invention and its practical application.

The preceding description is intended to enable others skilled in the art to best utilize the invention in various embodiments and with various modifications as are suited to the particular use contemplated. It is intended that the scope of the invention be defined by the following claims.

What is claimed is:

1. A multilayer automotive hose, which comprises:
    an innermost layer of elastomer material, which comprises between about 40% and about 80% vinylacetate by weight in a copolymer; and
    a separate outermost layer of elastomer material, which comprises between about 40% and about 80% vinylacetate by weight in a copolymer.

2. A multilayer automotive hose according to claim 1, wherein said vinylacetate is present in said elastomer material in a range between about 60% and about 70% by weight.

3. A multilayer automotive hose according to claim 1, wherein said vinylacetate in said innermost and outermost layers is copolymerized with ethylene.

4. A multilayer automotive hose according to claim 1, wherein each of said innermost and outermost layers is a non-thermoplastic elastomer.

5. An automotive hose according to claim 1, which further comprises:
    a middle layer comprising reinforcement fibers, and disposed between said innermost and outermost layers.

6. A multilayer automotive hose according to claim 5, wherein said middle layer is disposed directly between said innermost layer and said outermost layer.

7. A multilayer automotive hose according to claim 1, wherein each of said innermost layer and said outermost layer is an elastomer having a fully saturated backbone.

8. A multilayer automotive hose according to claim 1, wherein each of said innermost layer and said outermost layer is a nonhalogenated elastomer.

9. A method of manufacturing a multilayer automotive hose, which comprises:
    forming an innermost layer of elastomer material which comprises between about 40% and about 80% vinylacetate by weight in a copolymer, by an extrusion process; and
    forming a separate outermost layer of elastomer material which comprises between about 40% and about 80% vinylacetate by weight in a copolymer, by an extrusion process.

10. A method according to claim 9, wherein said vinylacetate is present in said elastomer material in a range between about 60% and about 70% by weight.

11. A method according to claim 9, wherein said vinylacetate in said innermost and outermost layers is copolymerized with ethylene.

12. A method according to claim 9, wherein each of said innermost and outermost layers is a non-thermoplastic elastomer.

13. A method according to claim 9, which further comprises:
    forming a middle layer comprising reinforcement fibers between said innermost and outermost layers.

14. A method according to claim 13, wherein said middle layer is disposed directly between said innermost layer and said outermost layer.

15. A method according to claim 9, wherein each of said innermost layer and said outermost layer is an elastomer having a fully saturated backbone.

16. A method according to claim 9, wherein each of said innermost layer and said outermost layer is a nonhalogenated elastomer.

* * * * *